United States Patent
Grzeskowiak

(10) Patent No.: US 10,263,687 B2
(45) Date of Patent: Apr. 16, 2019

(54) PHASE-DIVERSITY RADIO-FREQUENCY RECEIVER

(71) Applicants: Continental Automotive France, Toulouse (FR); Continental Automotive GmbH, Hannover (DE)

(72) Inventor: Jean-Christophe Grzeskowiak, Bû (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/767,533

(22) PCT Filed: Oct. 12, 2016

(86) PCT No.: PCT/EP2016/001693
§ 371 (c)(1),
(2) Date: Apr. 11, 2018

(87) PCT Pub. No.: WO2017/063738
PCT Pub. Date: Apr. 20, 2017

(65) Prior Publication Data
US 2018/0309498 A1 Oct. 25, 2018

(30) Foreign Application Priority Data
Oct. 14, 2015 (FR) ...................... 15 59760

(51) Int. Cl.
*H04B 1/16* (2006.01)
*H04B 7/12* (2006.01)
*H04B 7/08* (2006.01)

(52) U.S. Cl.
CPC ............... *H04B 7/12* (2013.01); *H04B 1/16* (2013.01); *H04B 7/086* (2013.01); *H04B 7/0837* (2013.01)

(58) Field of Classification Search
CPC . H04B 1/16; H04B 7/12; H04B 7/084; H04B 7/0845; H04B 7/0837; H04B 7/0874; H04B 1/1081; H04B 7/0848
See application file for complete search history.

(56) References Cited

U.S. PATENT DOCUMENTS

| 5,710,995 A | 1/1998 | Akaiwa et al. |
| 7,221,925 B2 * | 5/2007 | Wildhagen ........... H04B 7/0857 375/347 |

(Continued)

FOREIGN PATENT DOCUMENTS

EP    1865620 A1    12/2007

OTHER PUBLICATIONS

English translation of the Written Opinion for International Application No. PCT/EP2016/001693, dated Jan. 30, 2017, 6 pages.
(Continued)

*Primary Examiner* — Thanh C Le
(74) *Attorney, Agent, or Firm* — RatnerPrestia

(57) ABSTRACT

A phase-diversity radio-frequency receiver, including two tuners tuned to the same frequency in order to produce two intermediate frequency signals, a combiner capable of implementing a constant modulus algorithm, CMA, in order to combine the two intermediate frequency signals into a single signal, a controller capable of transforming the single signal into a final signal having a constant envelope, the controller being parametrized by a control coefficient defining the control convergence speed, the control coefficient being recalculated permanently in accordance with at least one multi-path level.

6 Claims, 2 Drawing Sheets

(56) References Cited

U.S. PATENT DOCUMENTS

| | | | | |
|---|---|---|---|---|
| 7,324,794 B2* | 1/2008 | Chari | .................... | H04B 7/084 |
| | | | | 455/130 |
| 8,682,270 B2* | 3/2014 | Aoki | .................... | H04B 1/1081 |
| | | | | 455/138 |
| 2003/0031243 A1* | 2/2003 | Meehan | ............... | H04B 7/0845 |
| | | | | 375/233 |
| 2009/0061802 A1* | 3/2009 | Aoki | .................... | H04B 1/1081 |
| | | | | 455/205 |
| 2013/0115903 A1* | 5/2013 | Kroeger | ............... | H04B 7/0845 |
| | | | | 455/193.1 |

OTHER PUBLICATIONS

International Search Report and Written Opinion for International Application No. PCT/EP2016/001693, dated Jan. 30, 2017, 8 pages.
Shatara, R.S., "Dual receiver with phase and switched diversity for background processing and reception improvement," SAE Technical Paper Series, Society of Automotive Engineers, Warrendale, PA, No. 2008-01-1059, Apr. 14, 2008, XP002577671, ISSN: 0148-7191, Retrieved from the Internet: URL:http://delphi.com/pdf/techpapers/2008-01-1059.pdf, 10 pages.

* cited by examiner

PHASE-DIVERSITY RADIO-FREQUENCY RECEIVER

CROSS REFERENCE TO RELATED APPLICATIONS

This application is the U.S. National Phase Application of PCT International Application No. PCT/EP2016/001693, filed Oct. 12, 2016, which claims priority to French Patent Application No. 1559760, filed Oct. 14, 2015, the contents of such applications being incorporated by reference herein.

FIELD OF THE INVENTION

The present invention relates to radiofrequency transmissions, and more particularly to a phase-diversity radiofrequency receiver.

BACKGROUND OF THE INVENTION

It is known to produce such a phase-diversity radiofrequency receiver by using two tuners tuned to the same frequency. Each tuner thus produces an intermediate-frequency signal. These two intermediate-frequency signals are then combined using a constant modulus algorithm (or CMA) to form a single signal that is an optimum combination of the two intermediate-frequency signals. This single signal is then transformed into a useful signal by way of a gain control operation that determines a phase such that the final signal has a constant envelope. The control operation is conventionally parameterized by a control coefficient that determines the speed of convergence of the control operation.

The higher this control coefficient, the faster the convergence, but the more the risk of error increases. The lower this control coefficient, the slower the convergence, but the more the risk of error decreases. It is therefore important to choose the most suitable control coefficient at all times.

It is known to choose a fixed control coefficient, or to vary said control coefficient depending on the received field level and/or else depending on the presence of a co-channel.

However, such an approach leads to a compromise between speed and accuracy of calculation, which does not prove to be optimal. Thus, a fast speed may be very effective in some cases, whereas an excessively fast speed may lead to a result that is less optimized than the one that would be obtained with a single tuner in other cases. Likewise, a slow speed may be necessary in some cases to obtain a stable result, whereas an excessively low speed may render the phase diversity ineffective in other cases.

It is therefore necessary to improve the mode of determining said control coefficient.

SUMMARY OF THE INVENTION

The subject of an aspect of the invention is a radiofrequency receiver, of phase-diversity type, comprising two tuners tuned to the same frequency so as to produce two intermediate-frequency signals, a combining means able to implement a constant modulus algorithm so as to combine the two intermediate-frequency signals to form a single signal, a control means able to transform the single signal into a final signal having a constant envelope, the control means being parameterized by a control coefficient that defines the speed of convergence of the control operation, the control coefficient being recalculated continuously depending on at least one multipath level.

According to another feature, the control coefficient is also recalculated continuously depending on a received field level.

According to another feature, a function of calculating the control coefficient is an increasing function of the multipath level and, as the case may be, an increasing function of the received field level.

BRIEF DESCRIPTION OF THE DRAWINGS

Other features, details and advantages of the invention will become more clearly apparent from the detailed description provided below by way of indication with reference to the drawings, in which.

DETAILED DESCRIPTION OF THE PREFERRED EMBODIMENTS

Figure 1:
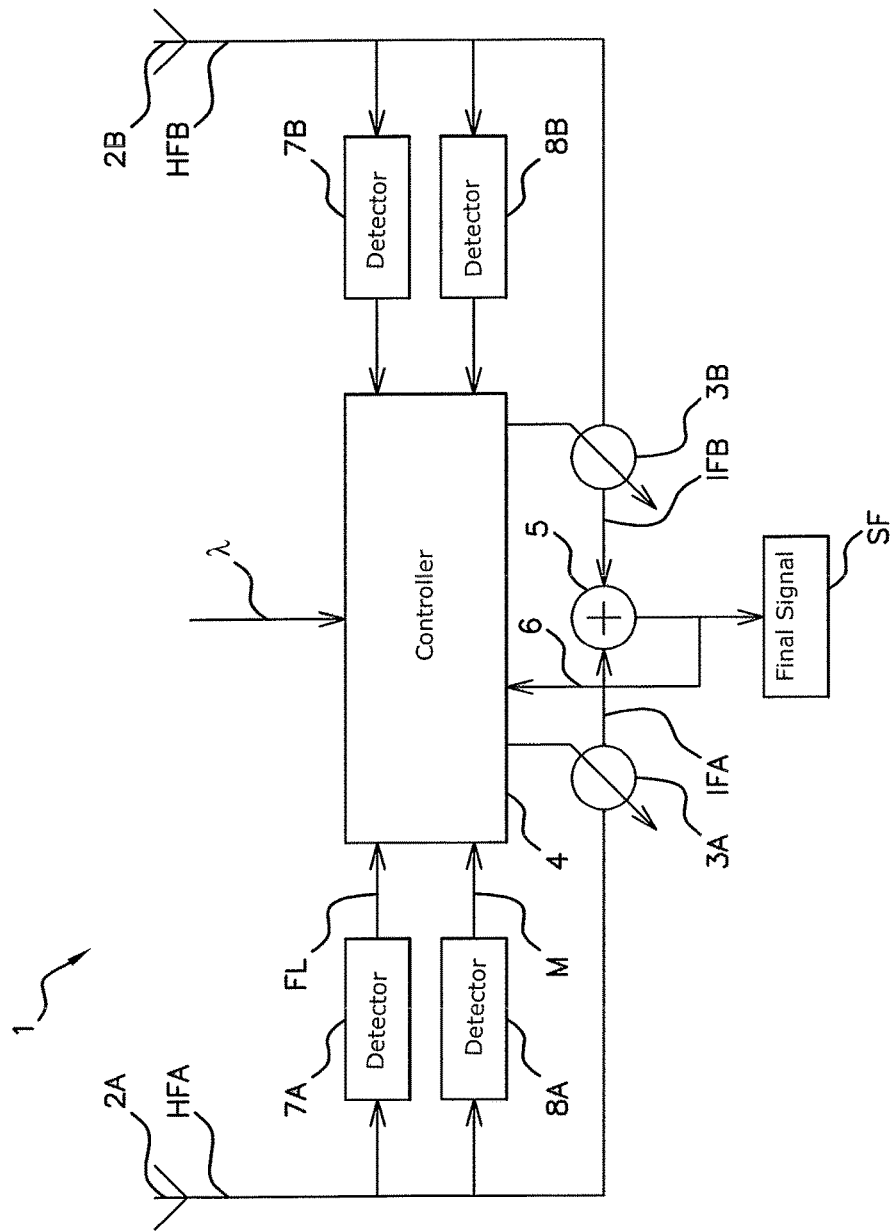
FIG. 1 shows a diagram of a phase-diversity receiver according to the prior art.

As illustrated in FIG. 1, a radiofrequency receiver 1, of phase-diversity type, comprises two independent antennae 2A, 2B each able to capture a high-frequency signal HFA, HFB. Each of the antennae 2A, 2B is connected to a tuner 3A, 3B. The two tuners 3A, 3B are tuned to the same frequency so as to produce two comparable signals IFA, IFB. Due to the demodulation applied by the tuner 3A, 3B, the frequency of a signal IFA, IFB is lowered significantly in relation to a high-frequency signal HFA, HFB. Reference is then made to an intermediate frequency (or IF). The radiofrequency receiver 1 also comprises a combining means 5. This combining means 5 is able to implement a constant modulus algorithm CMA in such a way as to combine the two intermediate-frequency signals IFA, IFB to form a single signal. The single signal is a combination of the two signals IFA, IFB that is optimized so as to provide a better signal. The single signal obtained by the CMA algorithm may be the signal IFA, the signal IFB, or any combination, such as IFA−IFB, or else IFA+IFB. Said single signal is then improved by way of a control means 4, 6 that transforms the single signal into a final signal SF. The control operation optimizes the phase and produces a final signal SF whose envelope is constant.

To this end, the control means 4, 6 is parameterized at least by a control coefficient $\lambda$. This control coefficient $\lambda$ is a means for defining the speed of convergence of the control operation.

This control coefficient $\lambda$ is typically a number that varies between 0 and 1, or else, as a percentage, between 0 and 100%. The slowest speed of convergence for the control operation corresponds to the lowest value 0. By contrast, the fastest speed of convergence for the control operation corresponds to the highest value 1 or 100%.

According to one prior art embodiment, as illustrated in FIG. 1, said control coefficient $\lambda$ is taken to be equal to a constant value. It is then generally a substantially average value between the lowest value and the highest value. Such regulation is not optimum, but allows for average effectiveness of the control operation, including in extreme cases.

Figure 2:
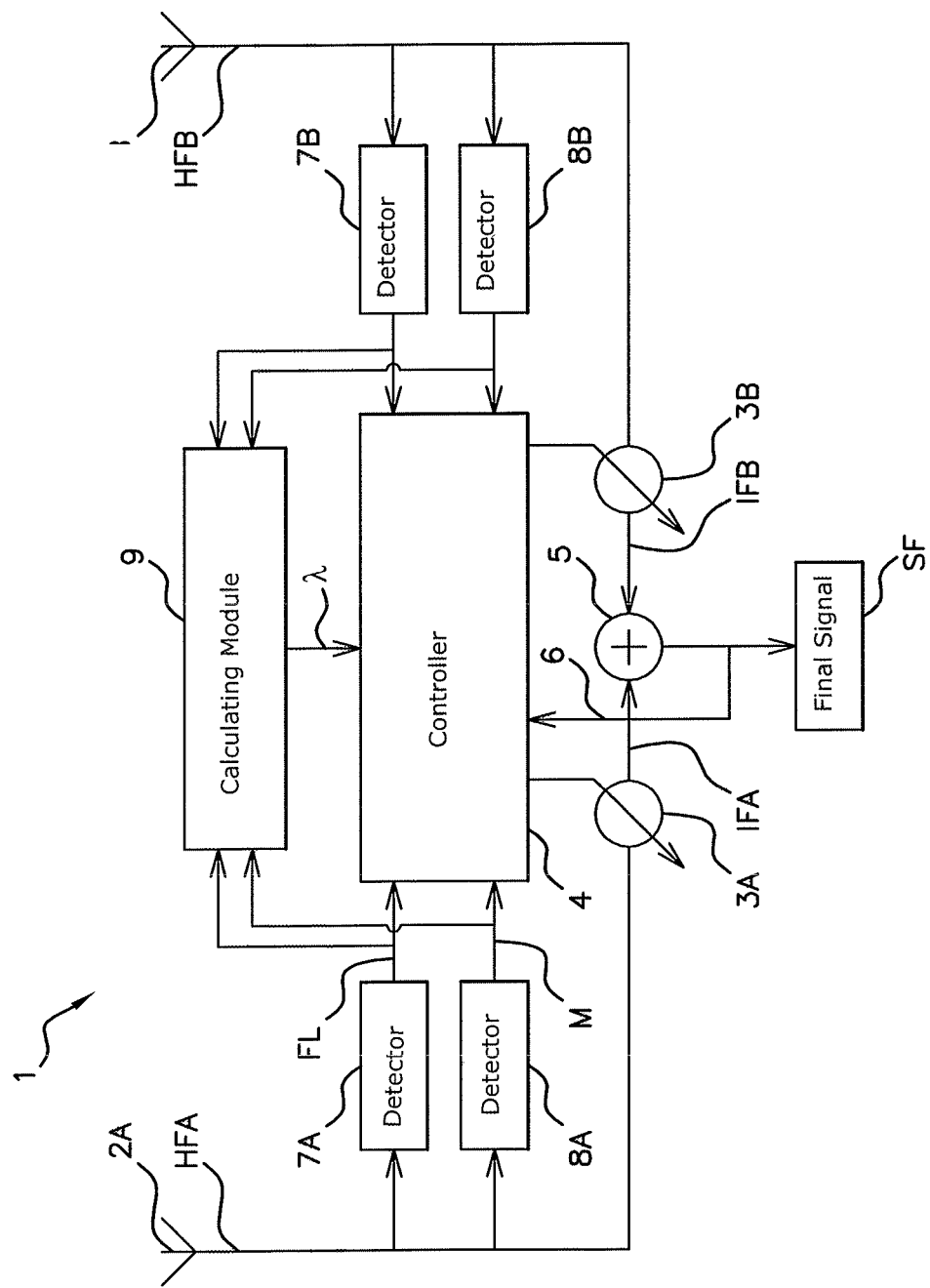
FIG. 2 shows a diagram of a phase-diversity receiver according to an aspect of the invention.

As illustrated in FIGS. 1 and 2, the combining means 5 requires, as input, for the purposes of the CMA algorithm, in addition to the two intermediate-frequency signals IFA, IFB, several items of information, relating to the environment in that the environment has an influence on radiofrequency reception. These items of information are most often derived from at least one of the received signals HFA, HFB, via one or more detectors 7A, 7B, 8A, 8B.

It is thus possible for the CMA algorithm to use a field level FL. A field level FL is typically a number between 0 and 1 or between 0 and 100%, indicative of the power of the received signal HFA, HFB. Such a field level FL is typically produced by a field level FL detector 7A, 7B from at least one of the two received signals HFA, HFB.

The CMA algorithm may also use a multipath level M. Such a multipath level M is typically a number between 0 and 1 or between 0 and 100%, indicative of a frequency of the multipaths taken by the received signal. HFA, HFB during its propagation. A low multipath level M, close to 0, indicates a low, even zero, multipath frequency, whereas a high level, close to 1 or 100%, indicates a high multipath frequency. Such a multipath level M is typically produced by a multipath level M detector 8A, 8B from at least one of the two received signals HFA, HFB.

Other items of information, not shown, may also be used by the CMA algorithm and the combining module 5. Mention may thus be made of a co-channel indicator.

As illustrated in FIG. 2, according to an aspect of the invention, the control coefficient λ is advantageously recalculated continuously by a calculating module 9. This makes it possible, using the correct items of information as input for the calculating module 9, to change the control coefficient λ depending on this item of information or these items of information so as to provide the control coefficient λ and thus the most suitable speed of convergence at all times, so as to produce a final signal SF at output that is as optimized as possible.

According to an aspect of the invention, one particularly advantageous feature consists in using at least one multipath level M indicator dependent on the number of multipaths encountered by the received signal HFA, HFB. Such an indicator, advantageously in that it already exists in the radiofrequency receiver 1 for the purposes of the CMA and is thus easily able to be reused, is a multipath level M, such as already produced by the detector 8A and/or by the detector 8B.

In addition, the control coefficient λ is also recalculated continuously depending on a received field level FL. Such an indicator, advantageously in that it already exists in the receiver for the purposes of the CMA and is thus easily able to be reused, is a received field level FL, such as already produced by the detector 7A and/or by the detector 7B.

In order to adjust the control coefficient λ depending on the environmental conditions, such as perceived by the multipath level M and, as the case may be, by the received field level FL, the control coefficient λ may be determined by way of a function of calculating the control coefficient. This function is advantageously an increasing function of the multipath level M. Thus, if the multipath level M is low, a low control coefficient λ is determined, thereby leading to a low speed of convergence of the control operation. By contrast, if the multipath level M is high, a high control coefficient λ is determined, thereby leading to a high speed of convergence of the control operation.

Likewise, if a received field level FL is used, the function of calculating the control coefficient λ is advantageously an increasing function of the field level FL. Thus, if the field level FL is low, a low control coefficient λ is determined, thereby leading to a low speed of convergence of the control operation. By contrast, if the field level FL is high, a high control coefficient λ is determined, thereby leading to a high speed of convergence of the control operation.

The respective contributions of the two multipath M and field FL levels, if they are used together, may or may not be balanced. If these contributions are not balanced, precedence is given to the multipath level M.

The two levels M, FL described are the most important in terms of influence on the adaptive calculation of the control coefficient λ. However, it is possible to use at least one other level or indicator so as to further improve the function of determining the control coefficient λ and thus the quality of the receiver 1.

The invention claimed is:

1. A phase-diversity radiofrequency receiver, comprising:
two tuners tuned to a same frequency so as to produce two intermediate-frequency signals from respective received signals,
a combining means adapted to implement a constant modulus algorithm, CMA, so as to combine the two intermediate-frequency signals to form a single signal,
a control means adapted to transform the single signal into a final signal having a constant envelope, the control means being parameterized by a control coefficient that defines the speed of convergence of the control operation, wherein the control coefficient is recalculated continuously depending on at least one multipath level indicative of a frequency of multipaths taken by the receive signals during propagation.

2. The receiver as claimed in claim 1, wherein the control coefficient is also recalculated continuously depending on at least one received field level.

3. The receiver as claimed in claim 2, wherein the function of calculating the control coefficient is an increasing function of the multipath level.

4. The receiver as claimed in claim 2, wherein the function of calculating the control coefficient is an increasing function of the multipath level and an increasing function of the received field level.

5. The receiver as claimed in claim 1, wherein the function of calculating the control coefficient is an increasing function of the multipath level.

6. The receiver as claimed in claim 1, wherein the function of calculating the control coefficient is an increasing function of the multipath level and an increasing function of the received field level.

* * * * *